United States Patent

Owens, Jr. et al.

[15] 3,648,231

[45] Mar. 7, 1972

[54] METHOD AND MEANS FOR PROVIDING A SYNTHETIC REAL WORLD RUNWAY CENTERLINE DISPLAY

[72] Inventors: Abner Owens, Jr., Paramus; John F. Yurasek, Oakland, both of N.J.

[73] Assignee: The Bendix Corporation

[22] Filed: Dec. 12, 1969

[21] Appl. No.: 884,420

[52] U.S. Cl. .......................................340/27 NA, 343/108 R
[51] Int. Cl. ...............................................................G08g 5/02
[58] Field of Search ................340/26, 25, 27 NA; 343/108 R

[56] References Cited

UNITED STATES PATENTS

| | | | |
|---|---|---|---|
| 3,471,742 | 10/1969 | Kendall et al. | 343/108 R |
| 3,573,827 | 4/1971 | De Botton et al. | 343/108 R |
| 3,345,632 | 10/1967 | Rover, Jr. | 343/108 R |
| 3,237,195 | 2/1966 | Schoffman | 343/119 |
| 3,305,865 | 2/1967 | Gassler | 343/108 |
| 3,324,471 | 6/1967 | Rover, Jr. | 343/108 |

*Primary Examiner*—Kathleen H. Claffy
*Assistant Examiner*—Randall P. Myer
*Attorney*—Ronald G. Gillespie and Plante, Hartz, Smith and Thompson

[57] ABSTRACT

A system in an aircraft for displaying a perspective view of a synthetic runway centerline on a cathode-ray tube in a heads-up display system for guiding a pilot while landing an aircraft on the real world runway at an airport when visibility is poor. The perspective of the synthetic runway centerline changes in accordance with changes in the position of the aircraft to the runway at the airport. Beacons located at each end of the runway's centerline provide signals to a receiver in the aircraft. The receiver provides signals corresponding to the positions of the beacons. A signal generator provides deflection voltages for a synthetic runway centerline display to a computer which modifies the deflection voltages in accordance with the signals from the receiver. The cathode-ray tube provides the perspective synthetic runway centerline display in accordance with the modified deflection voltages.

10 Claims, 6 Drawing Figures

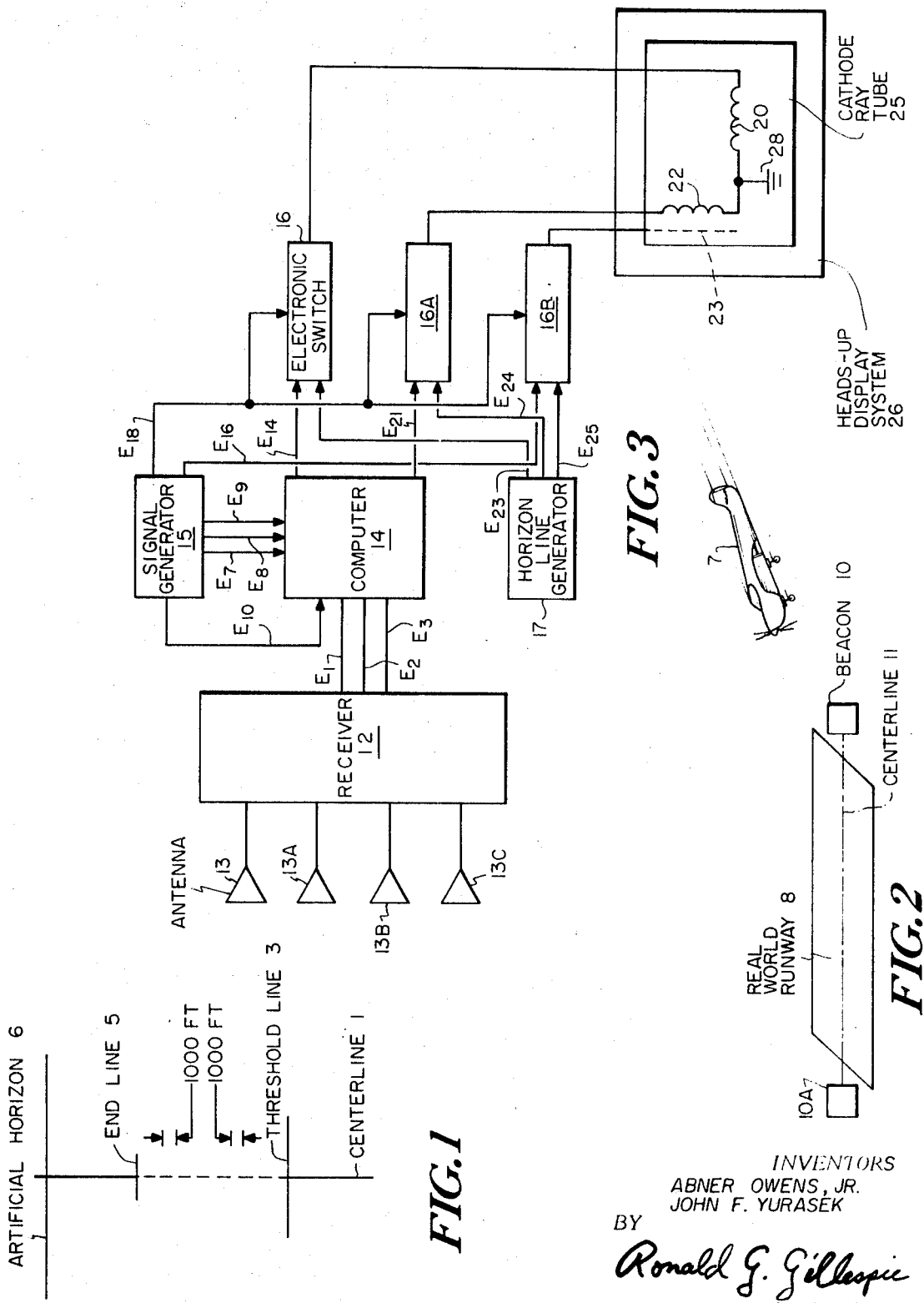

INVENTORS:
ABNER OWENS, JR.
JOHN F. YURASEK
BY
Ronald G. Gillespie
ATTORNEY

METHOD AND MEANS FOR PROVIDING A SYNTHETIC REAL WORLD RUNWAY CENTERLINE DISPLAY

BACKGROUND OF THE INVENTION

1. Field of the Invention

The present invention relates to displaying in an aircraft a synthetic runway centerline corresponding in a one-to-one relationship to an actual runway centerline as it appears to a pilot in an aircraft approaching the actual runway.

2. Description of the Prior Art

Heretofore, runway image generating apparatus in an aircraft such as disclosed in U.S. application Ser. No. 879,069, filed on Nov. 24, 1969 by John F. Yurasek and Abner Owens, Jr., inventors of the present invention, and assigned to The Bendix Corporation, assignee of the present invention, uses instrument landing system and distance measuring signals from the airport along with signals corresponding to the attitude and altitude of the aircraft to modify deflection voltages to provide the perspective synthetic runway display.

The present invention differs from the Yurasek invention in using two beacons located at both ends of the real world runway centerline. A receiver provides signals corresponding to the positions of the beacons. The changing of the signals from the receiver, as the beacons positions relative to the aircraft changes, are used to modify deflection voltages to display the perspective synthetic runway centerline. The present invention enhances the accuracy of the Yurasek invention since the beacons are located at the ends of the runway while the instrument landing system transmitter and the distance measuring signal transmitter required in the Yurasek invention are generally not located at the real world runway.

SUMMARY OF THE INVENTION

A system for displaying in an aircraft landing at an airport a perspective synthetic runway centerline, comprising beacons located at each end of the centerline of the airport runway and transmitting signals. Receiving means in the aircraft receive the signals and provide pulse trains corresponding to the positions of the beacons. Voltage means in the aircraft provide deflection voltages and bright-up pulse voltages for a synthetic runway centerline. Modifying means receive the deflection voltages and the pulse trains from the voltage means and the receiving means, respectively, and modify the deflection voltages in accordance with the pulse trains to provide modified deflection voltages. The modified deflection voltages are applied to a cathode ray tube along with the bright-up pulse voltages from the voltage means. The cathode ray tube displays the perspective synthetic runway centerline in accordance with the modified deflection voltages and the bright-up pulse voltages.

One object of the present invention is to display a perspective synthetic runway centerline to a pilot of an aircraft, that is landing at an airport, that overlays the centerline of the airport runway.

Another object of the present invention is to display in an aircraft a synthetic runway centerline that changes in a one-to-one relationship to an airport runway centerline as the relationship between the airport runway centerline and the aircraft changes.

Another object of the present invention is to modify deflection voltages for a synthetic runway centerline in accordance with signals corresponding to the positions of beacons located at both ends of an airport runway centerline.

Another object of the present invention is to use signals corresponding to the positions of beacons located at an airport's runway to replace instrument landing and distance measuring signals and signals corresponding to the attitude and altitude of an aircraft landing at the airport in displaying a perspective synthetic runway centerline.

Another object of the present invention is to provide a display in an aircraft corresponding to an airport runway, that the aircraft is landing at, with greater accuracy than heretofore achieved.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

BRIEF DESCRIPTION OF THE DRAWINGS

FIG. 1 is a display of a synthetic runway centerline on a heads-up display device having a threshold line and an end line to provide information corresponding to the start and end, respectively, of a safe landing area.

FIG. 2 depicts a real world runway of an airport having beacons located at each end of the runway's centerline for transmitting pulse trains to an approaching aircraft.

FIG. 3 is a block diagram of a system for generating a perspective synthetic runway centerline on a cathode-ray tube in a heads-up display system.

DESCRIPTION OF THE INVENTION

Figure 4:
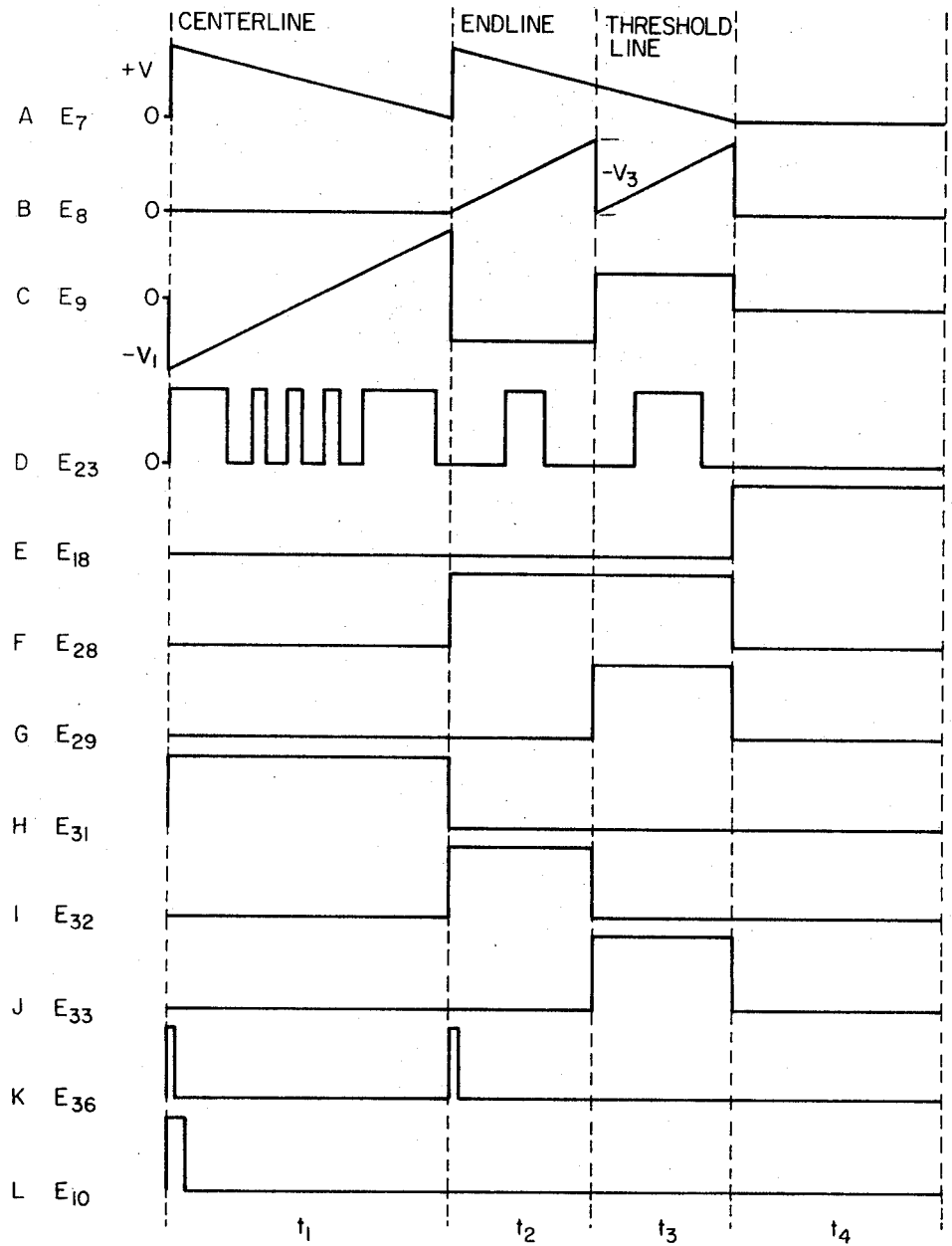
FIG. 4 depicts the signal waveforms of the signals appearing in FIGS. 3 and 5.

It is desirable to provide the pilot of an aircraft with a visual display of a synthetic runway centerline, when visibility is poor, which overlays the centerline of the runway of an airport which the aircraft is attempting to land on. It is important that the synthetic runway centerline changes in a one-to-one relationship to the actual runway centerline to simulate the appearance of the actual runway centerline as the relationship between the aircraft and the actual runway centerline changes.

Referring to FIG. 1, there is shown a display of a synthetic runway centerline 1 on a heads-up display device having a threshold line 3 and an end line 5 to provide information corresponding to the start and end, respectively, of a safe landing area. An artificial horizon 6 informs the pilot of the attitude of the aircraft about the roll and pitch axes. The position and size of synthetic runway centerline 1 convey an impression of distance of the aircraft from the real world runway and the orientation of synthetic runway centerline 1 provides a sense of the pitch, roll and yaw attitudes of the aircraft. Centerline 1 is divided into 1,000 foot segments to provide the pilot with a sense of speed as he is landing.

Referring to FIG. 2, there is shown an aircraft 7 landing on a runway 8 of an airport having beacons 10, 10A located at each end of the runway's centerline 11 and transmitting pulse trains.

Referring to FIG. 3, aircraft 7 has a receiver 12 having antennae 13 through 13C receiving the pulse trains from beacons 10, 10A. Receiver 12 may be of a type similar to the one disclosed in U.S. Pat. No. 3,237,195 issued Feb. 22, 1966 to J. Schiffman, except that the pulse trains applied to the cathode-ray tube in the Schiffman patent are now applied to a computer 14 as pulse trains $E_1$, $E_2$ and $E_3$. Pulse trains $E_1$, $E_2$ include vertical and horizontal deflection pulses, respectively, which correspond to the relative positions of beacons 10, 10A as explained in the Schiffman patent. Pulse train $E_3$ is the bright-up pulse train of the Schiffman patent. Computer 14 converts pulse trains $E_1$, $E_2$ to direct current voltages which are used to modify deflection signals as hereinafter explained.

A signal generator 15 provides deflection signals $E_7$, $E_8$ and $E_9$, having the waveforms shown in FIGS. 4A, 4B and 4C, respectively, and control signal $E_{10}$ to computer 14. Electronic switches 16, 16A and 16B, controlled by a control signal $E_{18}$ from signal generator 15, passes signals $E_{14}$ and $E_{21}$ from computer 14, and a bright-up signal $E_{16}$ from signal generator 15, respectively, during time periods $t_1$, $t_2$ and $t_3$ and passes signals $E_{23}$, $E_{24}$ and $E_{25}$ from a horizon line generator 17, which may be of a type well known in the art, during time period $t_4$, for displaying the artificial horizon 6. The frequency of the time periods is such that runway centerline 1, threshold line 3, end line 5, and the artificial horizon 6 appear to be displayed simultaneously. The passed signals from switches 16, 16A and 16B are applied to coils 20, 22 and a grid 23, respectively, of a cathode-ray tube 25 which is part of a heads-up display system 26. Coils 20, 22 are the horizontal and vertical deflection coils, respectively, and are connected to ground 28.

Figure 5:
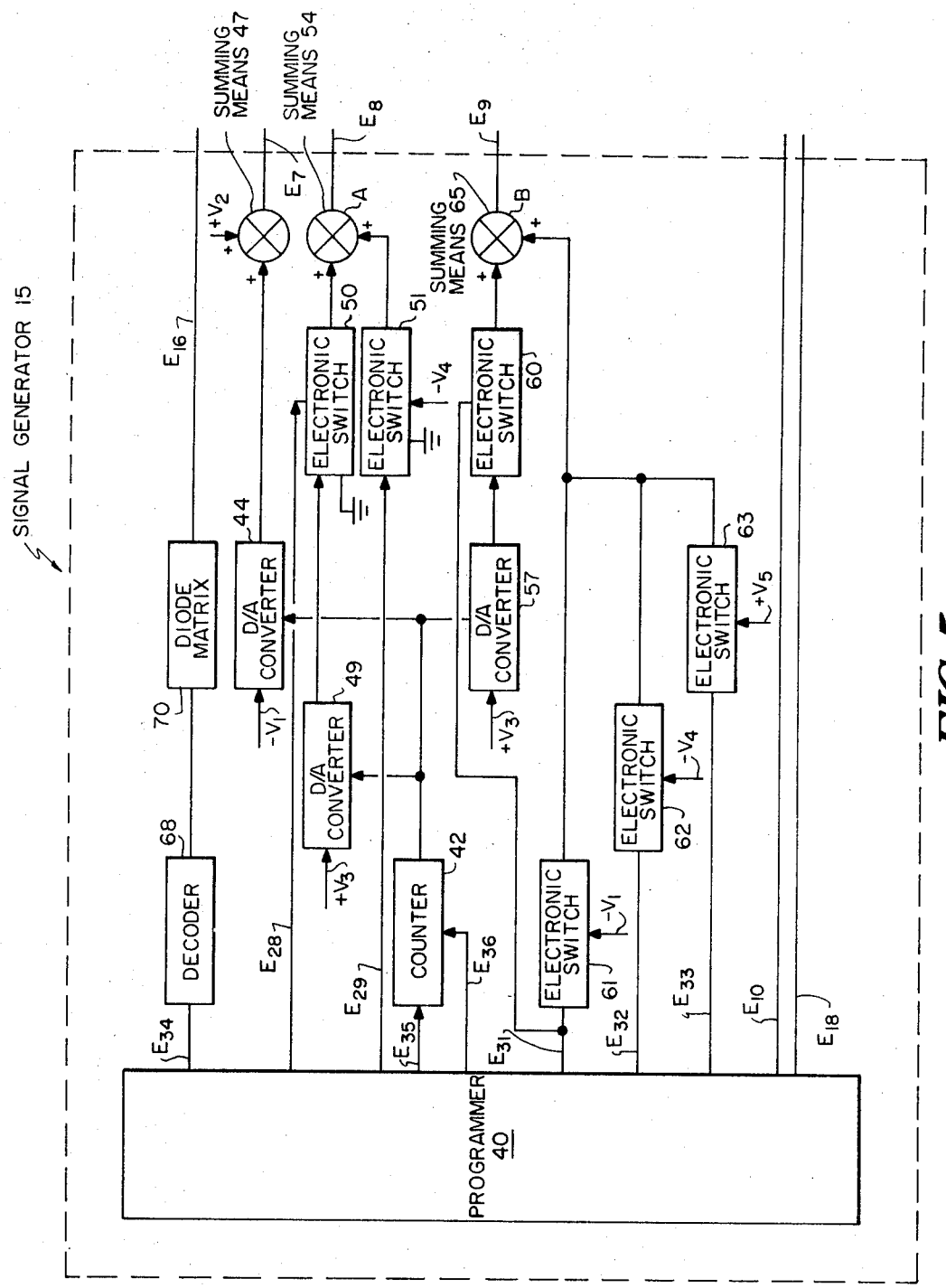
FIG. 5 is a detailed illustration of the signal generator 15 appearing in FIG. 3.

Referring to FIG. 5, there is shown signal generator 15 in which a programmer 40 provides 'clear' pulse $E_{10}$, control signals $E_{18}$ and $E_{28}$ through $E_{34}$, timing pulses $E_{35}$ and a reset pulse train $E_{36}$, in accordance with a predetermined program. A counter 42 counts timing pulses $E_{35}$ from programmer 40 and provides a digital output corresponding to the count. Counter 42 is reset at the start of time periods $t_1$, $t_2$ by reset pulse train $E_{36}$, which is shown in FIG. 4K.

Signal $E_7$ is generated by circuitry including a conventional type digital-to-analog converter 44 controlled by a negative direct current voltage $-V_1$ to convert the digital output from counter 42 to a negative going ramp voltage. The negative going ramp voltage is summed with a positive direct current voltage $+V_2$ by summing means 47 to provide signal $E_7$ for time period $t_1$ as shown in FIG. 4A. The resetting of counter 42 at the start of time period $t_2$ by reset pulse train $E_{36}$ repeats the waveform of time period $t_1$ during time periods $t_2$ and $t_3$, as shown in FIG. 4A.

The circuit for generating signal $E_8$ includes a conventional type digital-to-analog converter 49, which converts the digital output from counter 42 to a positive going ramp voltage in accordance with an applied positive direct current voltage $+V_3$, electronic switches 50 and 51, and summing means 54. Electronic switches 50, 51 are controlled by signals $E_{28}$ and $E_{29}$, respectively, which are shown in FIG. 4F and 4G, from programmer 40 to positively ground the inputs to summing means 54 during time periods $t_1$, $t_4$ so that summing means 54 provides a zero amplitude signal as signal $E_8$ during time periods $t_1$ and $t_4$. During time period $t_2$, signal $E_{28}$ positively controls switch 50 to pass the positive going ramp voltage from converter 49 to summing means 54 which provides the ramp voltage as signal $E_8$ during time period $t_2$. During time period $t_3$, switch 51 passes a negative direct current voltage $-V_4$ to summing means 54 in response to signal $E_{29}$ causing the ramp voltage from switch 50 to be offset by voltage $-V_4$ to provide signal $E_8$ for time period $t_3$.

Signal $E_9$ is generated by a conventional type digital-to-analog converter 57, electronic switches 60, 61, 62 and 63, and summing means 65. Converter 57 converts the digital output from counter 42 to a positive going ramp voltage in accordance with a positive direct current $+V_3$. Switches 60, 61 are controlled by signal $E_{31}$, as shown in FIG. 4H, from programmer 40 to pass the ramp voltage from converter 57 and negative direct current voltage $-V_1$, respectively, to summing means 65 which sums the voltages to provide signal $E_9$ for time period $t_1$. Switch 62 is controlled by signal $E_{32}$, shown in FIG. 4I, to pass a negative current voltage $-V_4$ during time period $t_2$ while switch 63 is controlled by signal $E_{33}$, as shown in FIG. 4J, to pass a positive direct current voltage $+V_5$ during time period $t_3$. Summing means 65 provides the passed direct current voltages $-V_4$ and $+V_5$ from switches 62 and 63, respectively, as signal $E_9$ during time period $t_2$ and $t_3$, respectively, and provides a zero amplitude output during time period $t_4$.

Programmer 40 provides reset pulse $E_{10}$ to computer 10, control signal $E_{18}$, as shown in FIG. 4E, to switches 16, 16A and 16B, and signal $E_{34}$ to a decoder 68 which controls a diode matrix 70 to provide bright-up signals $E_{23}$ as shown in FIG. 4D.

Figure 6:
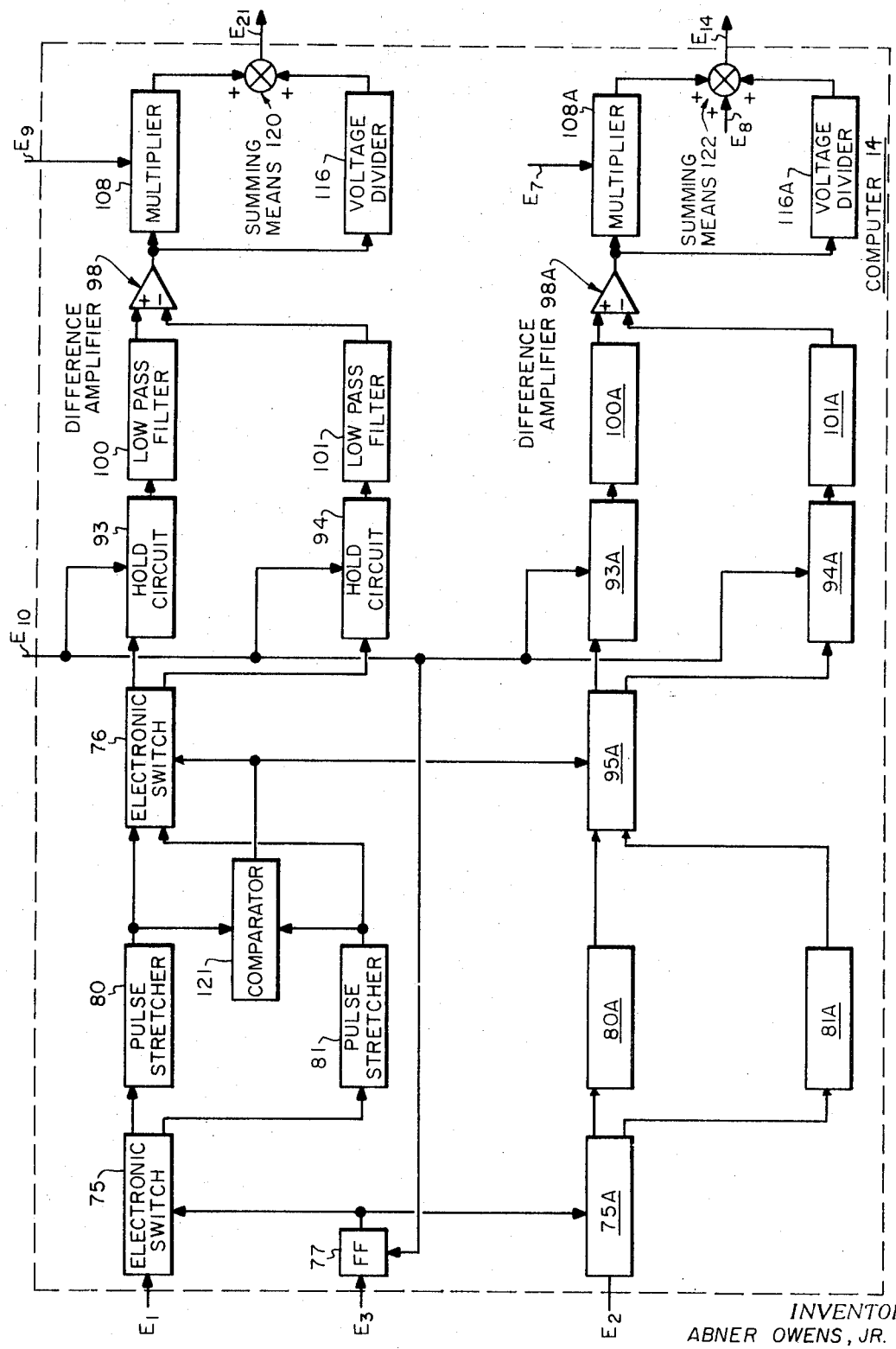
FIG. 6 is a detailed illustration of the computer 14 appearing in FIG. 3.

Referring to FIG. 6, computer 10 utilizes the relationship between the beacons 10, 10A that is inherent in the pulses of pulse trains $E_1$, $E_2$ to modify the signals for the nonperspective runway centerline display to provide the modified deflection signals $E_{14}$, $E_{21}$ which controls the election beam of cathode-ray tube 22 to provide the perspective runway centerline display.

The circuit for processing pulse train $E_1$ to provide deflection signal $E_{21}$ includes electronic switches 75 and 76, a conventional type flip-flop 77, pulse stretchers 80 and 81, conventional type hold circuits 93 and 94, low-pass filters 100 and 101, a conventional type difference amplifier 98, a multiplier 108, a voltage divider 116, and summing means 120.

Switch 75 receives vertical deflection pulse train $E_1$ from receiver 7 and is controlled by an output from flip-flop 77 to separate the pulses in pulse train $E_1$ so that pulses corresponding to the positions of beacon 10, 10A are applied to pulse stretchers 80 and 80A, respectively. Pulse train $E_3$, having the same repetition rate as pulse trains $E_1$ and $E_2$, controls flip-flop 77 to alternately change state causing flip-flop 77 to provide a pulse train having half the repetition rate of pulse trains $E_1$, $E_2$. Switch 75 passes a pulse in pulse train $E_1$ to pulse stretcher 80 in response to a pulse from flip-flop 77 and passes a pulse in pulse train $E_1$ to pulse stretcher 81 when there is no pulse from flip-flop 77.

The pulses in pulse train $E_1$ have narrow pulse widths. Pulse stretchers 80, 81 extend the pulse width of those pulses so that the extended pulses may be subsequently held to provide a direct current voltage. The extended pulses from pulse stretchers 80, 81 are applied to hold circuits 93, 94 through an electronic switch 95, as hereinafter explained. Hold circuits 93, 94 provide direct current voltages to a difference amplifier 98 through low-pass filters 100 and 101, respectively. Low-pass filters 100, 101 filters out any perbutations of the voltages from hold circuits 93, 94 which may be caused by ground reflection of the transmissions from beacons 10, 10A. Difference amplifier 98 provides an output corresponding to the difference between the direct current voltages from hold circuits 93, 94.

To assure that centerline 1 of the display of FIG. 1 appears right side up, it is necessary that difference amplifier provide a positive direct current output. This is accomplished by a conventional type comparator 121 which compares the pulses from pulse stretchers 80, 81 and provides an output to electronic switch 76 when the amplitude of the pulses from pulse stretcher 81 is greater than the amplitudes of the pulses from pulse stretcher 80. Electronic switch 76 passes the pulses from pulse stretchers 80, 81 to hold circuits 93 and 94, respectively, when comparator 121 provides no output and passes the pulses from pulse stretchers 80, 81 to hold circuits 94 and 93, respectively, when comparator provides an output to switch 76 so that direct current voltage from hold circuit 93 always has a greater amplitude than the voltage from hold circuit 94.

As the positions of beacons 10, 10A change relative to aircraft 7, the output from amplifier 98 changes accordingly. Multiplier 108 multiplies signal $E_9$ from signal generator 15 with the output from amplifier 98 to provide a deflection signal for display runway 1.

The output from difference amplifier 98 is divided in half by divider 116 to provide a signal for positioning the vertical deflection signal from multiplier 108. Summing means 120 sums the signal from multiplier 108 with the signal from voltage divider 116 to provide signal $E_{21}$ as the vertical deflection signal for the display shown in FIG. 1.

Signal $E_2$ is processed by elements identified by the suffix A which are connected and operate in a similar manner as elements having the same numerical designation without the suffix A. Switches 75A, 76A are controlled by the outputs from flip-flop 82 and comparator 121, respectively.

The output from difference amplifier 98A is multiplied with signal $E_8$ from signal generator 15 by multiplier 108A which provides a signal corresponding to the product to summing means 122. Summing means 122 sums the signals from multiplier 108A and voltage divider 116A with signal $E_7$ from signal generator 15 to provide signal $E_{14}$ as the horizontal deflection signal.

Flip-flop 77 and hold circuits 93, 94, 93A and 94A are periodically reset by reset pulse train $E_{10}$ from signal generator 15 to enhance the accuracy of computer 10.

The device of the present invention displays in an aircraft a perspective synthetic runway centerline that overlays the centerline of an airport runway and which changes in a one-to-one relationship to the airport runway centerline as the relationship between the airport runway centerline and the aircraft changes. The device of the present invention modifies deflection voltages for a synthetic runway centerline in accordance with signals corresponding to the positions of beacons located at both ends of the airport runway centerline. The device of the present invention uses the position signals to eliminate the need for instrument landing and distance measuring signals and signals corresponding to the attitude and altitude of the aircraft in displaying the perspective synthetic runway centerline with greater accuracy than heretofore achieved.

We claim:

1. A system for displaying in an aircraft landing at an airport a perspective synthetic runway centerline, comprising beacons located at each end of the centerline of the airport runway and transmitting signals, means on the aircraft for receiving the signals form the beacons and providing pulse trains corresponding to the positions of the beacons, voltage means on the aircraft for providing deflection voltages and bright-up pulse voltages for a synthetic runway centerline, means connected to the receiving means and to the voltage means for modifying the deflection voltages in accordance with the pulse trains from the receiving means, and a cathode-ray tube connected to the modifying means and to the voltage means for displaying the perspective synthetic runway centerline in accordance with the modified deflection voltages and the bright-up pulse voltages from the modifying means and from the voltage means, respectively;

each cycle of a predetermined programming means for programming the deflection voltages divided into four time periods and the voltage means including means for providing a first horizontal deflection voltage, means for providing a second horizontal deflection voltage, means for providing a vertical deflection voltage, means for providing the bright-up pulse voltages, said programming means for controlling the deflection voltage means and the bright-up pulse voltage means and providing control signals and timing pulses, and a counter connected to the said programming means and to all the deflection voltage means for counting the timing pulses and providing a digital output to all the deflection voltage means corresponding thereto and being reset by the said programming means at the start of the first and second time periods; and the bright-up pulse voltage means including a diode matrix, and a decoder connecting the matrix to the said programming means for controlling the matrix to provide the bright-up pulse voltages in accordance with a signal from the said programming means.

2. A system of the kind described in claim 1 further comprising means for providing voltages for an artificial horizon display; and switching means connected to the artificial horizon voltage means, to the modifying means, to the voltage means, and to the cathode-ray tube for alternately applying the voltages from the artificial horizon voltage means and the modified deflection voltages and the bright-up pulse voltages from the modifying means and voltage means, respectively, to the cathode-ray tube at a predetermined rate so that the cathode-ray tube appears to simultaneously display the synthetic runway centerline and the artificial horizon.

3. A system of the kind described in claim 1 in which the first horizontal deflection voltage means includes a digital-to-analog converter connected to the counter and receiving a positive direct current voltage for converting the digital output from the counter to a positive going ramp voltage in accordance with the positive direct current positive voltage, summing means having two inputs and providing the first horizontal deflection voltage in accordance with the sum of the signals applied to its inputs, and switching means connected to the programming means, to the converting means, to both inputs of the summing means and to ground and receiving a negative direct current voltage and positively controlled by the programming means to ground both inputs of the summing means during the first and fourth time periods, to pass the ramp voltage from the converter to one input of the summing means while grounding the other input during the second time period and to pass the ramp voltage from the converter to one input and the negative direct current voltage to the other input of the summing means during the third time period.

4. A system of the kind described in claim 1 in which the second horizontal deflection voltage means includes a digital-to-analog converter connected to the counter and receiving a negative direct current voltage for converting the digital output from the counter to a negative going ramp voltage in accordance with the negative direct current voltage, and summing means connected to the converter and receiving a positive direct current voltage for summing the ramp voltage from the converter with the positive direct current voltage to provide the second horizontal deflection voltage.

5. A system of the kind described in claim 1 in which the vertical deflection voltage means includes a digital-to-analog converter connected to the counter and receiving a positive direct current voltage for converting the output from the counter to a positive going ramp voltage in accordance with the positive direct current voltage, summing means having two inputs and providing the vertical deflection voltage in accordance with the sum of the signals applied to its inputs, and switching means connected to the programming means, to the converter and receiving two negative direct current voltages and a positive direct current voltage and positively controlled by the programming means to pass the ramp voltage from the converter to one input of the summing means during the first time period and to block the ramp voltage so as to provide a zero amplitude signal to the one input of the summing means during the second and third time periods, and to pass one negative direct current voltage, the other negative direct current voltage and the positive current voltages to the other input of the summing means during the first, second and third time periods, respectively.

6. A system of the kind described in claim 1 in which the modifying means includes two pulse train processing channels, each processing channel including means connected to the receiving means for converting a pulse train from the receiving means to direct current voltages, each direct current voltage corresponding to the position of a different beacon, means connected to the converting means for providing a signal corresponding to the difference between the direct current voltages, a voltage divider connected to the difference means for providing a signal corresponding to one-half of the difference signal, and one processing channel further includes multiplying means connected to the vertical deflection voltage means and to the difference means for multiplying the difference signal with the vertical deflection voltage and providing a signal corresponding thereto, and summing means connected to the multiplying means and to the voltage divider for summing the signals from the multiplying means and the voltage divider to provide a modified vertical deflection voltage, and the other processing channel further includes multiplying means connected to the difference means and to the second horizontal deflection voltage means for multiplying the difference signal with the second horizontal deflection voltage, and summing means connected to the first horizontal deflection voltage means, to the multiplying means and to the voltage divider for summing the first horizontal deflection voltage with the signals from the multiplying means and from the voltage divider to provide a modified horizontal deflection voltage.

7. A system of the kind described in claim 6 in which each converting means includes switching means connected to the receiving means and controlled by the receiving means for separating the pulses in a pulse train according to corresponding beacons, means connected to the switching means for stretching the pulses, a plurality of hold circuits, each hold circuit being connected to a corresponding pulse stretching means and holding the pulses from the pulse stretching means to provide a corresponding direct current voltage.

8. A system of the kind described in claim 7 further comprising control means connecting the difference means to the hold circuits for controlling direct current voltages from the hold circuits so that the difference signal is a positive direct current signal.

9. A system of the kind described in claim 8 in which the control means includes comparing means connected to the pulse stretching means of the processing channel providing the modified vertical deflection voltage for comparing the pulses from the pulse stretching means and providing an output when the pulses from one pulse stretching means have a greater amplitude than the pulses from the other pulse stretching means, and switching means in each processing channel connecting the pulse stretching means in that channel to the hold circuits in that channel and passing the pulses from one pulse stretching means to one hold circuit and the pulses from the other pulse stretching means to the other hold circuit in response to an output from the comparing means and passing the pulses from the one pulse stretching means to the other hold circuit and the pulses from the other pulse stretching means to the one hold circuit when the comparing means provides no output.

10. A system of the kind described in claim 7 in which the switching means includes a flip-flop connected to the receiving means and triggered by a pulse train to provide a pulse train output having half the repetition rate of the pulse train from the receiving means, and an electronic switch in each processing channel connecting the receiving means to each pulse stretching means and controlled by the pulse train from the flip-flop to pass a pulse train from the receiving means to one pulse stretching means in response to a pulse in the pulse train from the flip-flop and to pass the second mentioned pulse train from the receiving means to the other pulse stretching means during the absence of a pulse in the pulse train from the flip-flop.

* * * * *